April 1, 1969  J. K. SHARP ET AL  3,436,678
LASER CAPABLE OF CONTINUOUS FREQUENCY TUNING
Filed July 19, 1965

INVENTORS
JAMES K. SHARP
EO VAHER
BY
*John H. Gallagher*
ATTORNEY 3,436,678
LASER CAPABLE OF CONTINUOUS
FREQUENCY TUNING
James K. Sharp, Huntington, and Eo Vaher, Huntington Station, N.Y., assignors to Sperry Rand Corporation, Great Neck, N.Y., a corporation of Delaware
Filed July 19, 1965, Ser. No. 472,968
Int. Cl. H01s 3/08, 3/00
U.S. Cl. 331—94.5    9 Claims

ABSTRACT OF THE DISCLOSURE

A laser apparatus including an electro-optic member and an electro-optic interferometer positioned internal to the laser cavity, the interferometer being operative to transmit one of the plurality of laser resonant modes and suppress the others. A control voltage applied to the electro-optic member enables it to sweep the frequency of the individual laser modes across the Doppler broadened linewidth of the active lasing medium while a control voltage applied to the interferometer enables it to track a desired laser mode, thereby providing a narrow band output signal capable of being tuned throughout a wide band continuous frequency range.

---

The invention herein described was made in the course of or under a contract or subcontract thereunder, with the Department of the Air Force.

This invention relates to a laser device that emits light within a relatively narrow range of frequencies, and more particularly it is concerned with a frequency tunable laser in which the frequency of the emitted light is continuously tunable over substantially the entire fluorescent linewidth of the laser material.

Most basic lasers, for example ruby lasers, produce coherent light energy simultaneously at a large number of discrete, very narrow frequency ranges within a broad spectral band called the fluorescent linewidth of the lasing material. These narrow frequency ranges of light emission are uniformly spaced throughout the fluorescent linewidth of the lasing material by ranges of no light emission, these ranges being called spectral free ranges. This type of light emission is undesirable for many laser applications because it means that the available output energy of the lasing material is distributed throughout the many discrete narrow frequency bands, thereby limiting the energy available at a particular frequency and causing interference and confusion between the different frequency components during the processing of optical signals. In optical radar systems and in communications systems utilizing an optical carrier wave it is desired to have as much energy as practicable concentrated within one of the aforementioned discrete, narrow frequency ranges and to avoid having light energy at other frequencies within the fluorescent linewidth of the laser material.

In U.S. patent application Ser. No. 267,591, now U.S. Patent 3,358,243, entitled "Laser Having Interferometer Controlled Oscillatory Modes," filed Mar. 25, 1963, in the names of S. A. Collins and G. R. White, a way is disclosed for confining the output light energy of a laser to only one of the discrete narrow ranges of frequencies. As taught in said copending application, not only is the frequency of the laser light restricted, but the brightness of the selected narrow frequency range is enhanced and the beamwidth of the emitted light is narrowed. All of these desired features are achieved by providing one or more Fabry Perot interferometers or etalons within the laser cavity and tilting the etalon, or etalons, with respect to the central axis of the laser. The insertion of a tilted etalon into the laser cavity has the effect of eliminating from the laser cavity all light frequencies that do not satisfy the conditions for maximum transmission through the etalon. In other words, the only light frequency emitted by the laser will be that frequency for which both the laser cavity and the etalon are an integral number of half wavelengths long. The output frequency of the laser can be selected to be any one of the discrete, narrow frequency ranges within its fluorescent linewidth by proper adjustment of the etalon, but because these discrete frequency ranges are separated by the spectral free ranges, frequency tuning of the laser cannot be continuous and smooth but must skip between frequencies that are spaced by a spectral free range. There are uses for lasers in which it is desired that the output light be continuously tunable throughout a wide range of frequencies without any skipping. One example is an optical Doppler radar system in which it is desired that the frequency of the local oscillator signal "track" the Doppler frequency shift of the echo signal.

It therefore is an object of this invention to provide a laser device that is continuously frequency-tunable over a wide frequency range.

Another object of this invention is to provide a laser device that emits coherent light over an extremely narrow frequency range and which is frequency tunable to permit this narrow frequency range to continuously and smoothly vary throughout the fluorescent linewidth of the laser.

In accordance with the present invention, the frequency spectrum of a laser output signal is restricted to one, or a few adjacent narrow frequency bands, by including an interferometer within the laser cavity, this interferometer being inclined to the central axis of the laser. A variable index of refraction material, such as a birefringent electro-optic material, is placed within the interferometer for selecting the particular narrow frequency band of operation for the laser. However, this known arrangement is capable only of selecting discrete, spaced bands of frequency which are spaced by the laser spectral free range. To shift the resonant modes of the laser throughout its fluorescent linewidth and thereby make it possible to continuously tune the laser, or make it lase at any frequency within the fluorescent linewidth, a variable phase shifter is included in the laser cavity separate and distinct from the tunable interferometer. Now both the resonant bands of the laser and the frequency selectivity of the interferometer may be varied to select any resonant frequency within the fluorescent linewidth of the laser.

The invention will be described by referring to the accompanying drawings wherein.

Figure 1:
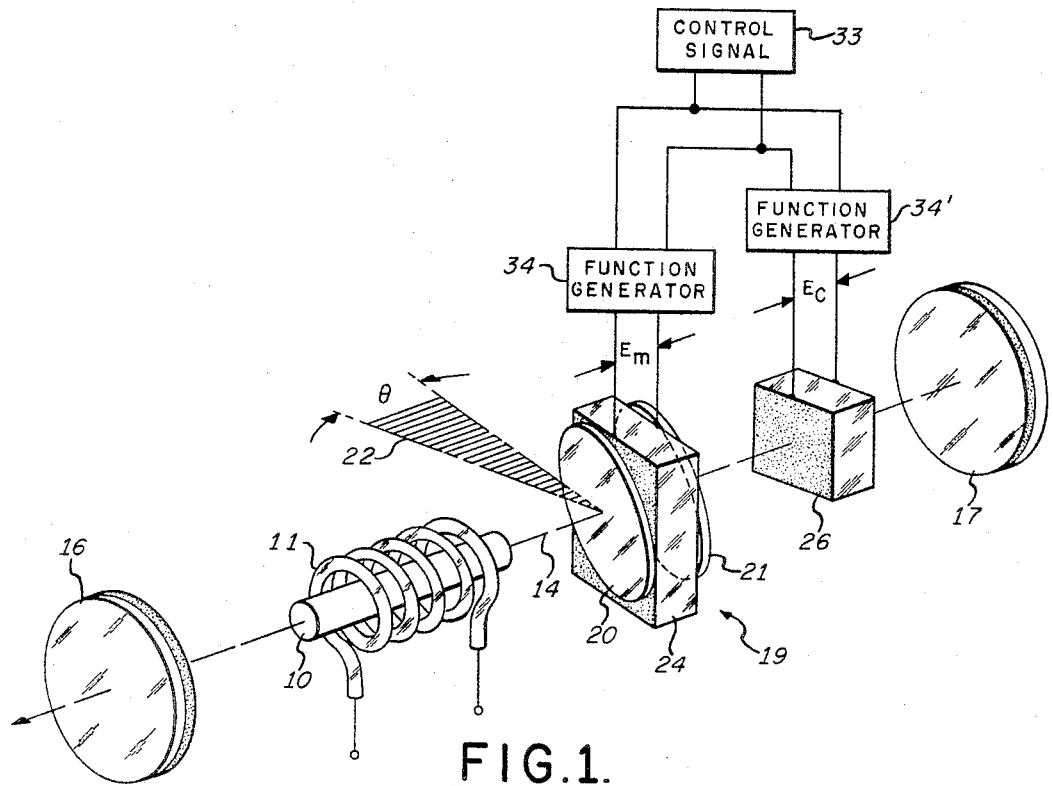
FIG. 1 is a simplified illustration of a linear laser cavity whose output signal is continuously tunable in accordance with the teachings of this invention.

Referring now in detail to the drawings, the simplified illustration of FIG. 1 depicts a continuously frequency tunable laser oscillator comprised of a crystal rod 10 of an active lasing material which when illuminated with flashes of light from flash lamp 11 produces phase coherent light through the known process of stimulated emission. The emitted coherent light propagates along the central axis 14 and is repeatedly reflected from the end mirrors 16 and 17 which define an optical cavity. As is common in lasers, end mirror 16 has a lower reflectivity than end mirror 17 so that the useful coherent light energy is emitted through end mirror 16. Rod 10 may be any of the known crystalline lasing material such as ruby, or alternatively, the active material could be any of the lasing gases, or any of the injection-type lasing media. In discussing the embodiment of FIG. 1, it will be assumed that the coherent light is plane polarized in a vertical plane of polarization, and if necessary to achieve this characteristic, polarizers may be added within the cavity, as is well understood in the art.

A Fabry Perot interferometer or etalon 19 comprised of mirrors 20 and 21, both of which have a reflectivity less than that of end mirrors 16 and 17, is disposed within the laser cavity and serves as a frequency selector, as will be explained in more detail below. Mirrors 20 and 21 are parallel to each other and each is inclined or canted by the angle $\theta$ to a line 22 that is normal to the central axis 14 of the laser cavity. A solid block of crystalline electro-optic material 24 is positioned between mirrors 20 and 21 and is adapted to have a variable voltage source $E_m$ impressed between two of its faces. The electro-optic material 24 is crystallographically cut and oriented so that the vertically plane polarized light waves propagate through the crystal along a preferred electro-optically active axis of the material. The voltage $E_m$ applied to the crystal controls the index of refraction that the material presents to the light beam and thus varies the optical length of the etalon 19, thereby affording means for frequency tuning the etalon.

A second solid block 26 of crystalline electro-optic material is positioned within the laser cavity and also is cut and oriented so that its index of refraction may be varied by the potential source $E_c$ to vary the optical length of the laser cavity for the coherent light energy propagating therein. The electro-optic crystals 24 and 26 may be any of the known electro-optic materials such as the dihydrogen phosphates of ammonium or potassium which commonly are referred to as ADP and KDP, respectively. Any other gaseous or liquid electro-optic materials also could be used if desired.

Figure 2:
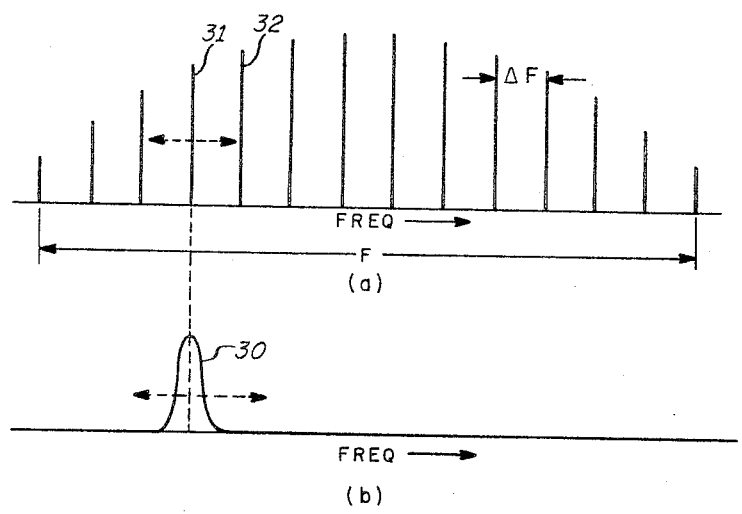
FIGS. 2a and 2b are curves of the frequency characteristics of the laser cavity and interferometer illustrated in FIG. 1 and are used to help explain the operation of the device illustrated in FIG. 1.

In explaining the operation of the above-described apparatus, reference will be made to FIG. 2 wherein FIG. 2a represents the spectral emission of a common laser oscillator which does not have a frequency selecting interferometer 19 included within the laser cavity. As is illustrated, the spectral emission of the laser is comprised of a plurality of discrete, very narrow bands or lines, these bands commonly being referred to as axial modes. These discrete axial modes are separated in frequency by regions called spectral free regions $\Delta F$, these spectral free regions being uniformly spaced throughout the fluorescent linewidth F of the lasing material, this spacing being equal to $c/2nL$ where $c$ is the velocity of light in free space, $n$ is the index of refraction of the medium between the laser end mirrors, and L is the physical length of the laser cavity. As is obvious from FIG. 2a, the emitted coherent light energy of the laser is distributed throughout the fluorescent linewidth F of the lasing material rather than being concentrated in any one or adjacent few of the axial modes. This type of emission often is undesirable, and as is taught in the aforementioned patent, the spectral emission of a laser may be restricted to one or a few closely grouped axial modes by the inclusion within the laser cavity of the Fabry-Perot interferometer or etalon 19 which is canted at the angle $\theta$ to the axis of the laser cavity. The effect that etalon 19 has on the spectral emission of the laser can be illustrated by reference to FIG. 2b wherein the curve 30 represents the frequency response characteristic of etalon 19, it being seen that this characteristic 30 is quite a narrow band as compared to the fluorescent linewidth F illustrated in FIG. 2a. Briefly stated, etalon 19 functions to offer maximum transmission only to the axial mode 31 of FIG. 2a, the etalon 19 being an integral number of half wavelengths long at the frequency corresponding to an axial mode 31. The active material of rod 10 now functions to lase only in the axial mode 31, and as explained in the abovementioned patent, the output of the laser not only is restricted to the one axial mode but the brightness of this axial mode is enhanced and the beamwidth of the emitted light is narrowed.

In order to make the laser tunable in frequency, it will be necessary to change the frequency response of etalon 19 so that it will be resonant at a different optical wavelength. This may be accomplished by varying the index of refraction of the electro-optical material 24 that is positioned within etalon 19. This is accomplished by varying the potential $E_m$ applied to the crystal 24. By referring to FIG. 2, it will be seen, however, that sliding the response curve 30 along the horizontal frequency axis will result in the curve 30 selecting individual ones of the spaced axial modes within the fluorescent linewidth F of the lasing material. It is obvious that this will result not in a smooth change in frequency but rather in jumping from one axial mode, 31 for example, to the next axial mode 32 which is spaced by the spectral free range $\Delta F$. This jumping effect is overcome in the present invention by adding the electro-optic crystal 26 which functions as a phase shifter to vary the optical length of the laser cavity and thereby change the resonant frequency of the laser cavity. This type of operation may be illustrated in FIG. 2 wherein it may be seen as the frequency response characteristic 30 of etalon 19 is shifted along the frequency axis, represented by the horizontal broken line, the variation of the index of refraction within electro-optic crystal 26 has the effect of also sliding the axial mode 31 and 32, for example, along the frequency axis so that the selected axial mode and the frequency response characteristic 30 will "track" each other to assure that the etalon 19 and the laser cavity always are optimumly resonant at the same optical frequency.

As is taught in U.S. Patent 3,358,243, the frequency response characteristic of etalon 19 also may be shifted by varying the angle $\theta$, FIG. 1, at which the etalon is canted with respect to the central axis 14 of the laser cavity. This could be done by any suitable mechanical means if it is desired to set the frequency at any desired fixed frequency. It also may be possible to continuously vary the angle $\theta$ by coupling a piezoelectric crystal to the etalon 19 so as to mechanically change the angle in response to an electrical signal applied to the piezoelectric crystal. However, for continuous frequency modulation of the laser output, and for rapid or for nonuniform changes in the frequency in the output signal it is believed that an electro-optic crystal will best satisfy the requirements for tuning both the etalon 19 and the laser cavity.

It will be appreciated that the variation in the index of refraction in the electro-optic material 24 will not only vary the resonant frequency of etalon 19 but also will have an effect on the resonant frequency of the laser cavity since it also is part of that cavity. However, an incremental change in the index of refraction of the material 24 will have different effects on the resonant characteristics of etalon 19 and the laser cavity, the result being that for a continuous change in the index of refraction of material 24 of the frequencies of etalon 19 and the laser cavity will not change in corresponding manners, that is, they will not track in frequency. It is for this reason that continuous smooth tuning over an appreciable band of frequencies can be achieved only with a separate phase shifting element such as the element 26 of FIG. 1.

In order to obtain smooth and continuous frequency tuning of the output signal of the laser the bias voltages $E_m$ and $E_c$ applied respectively to the variable index of refraction materials 24 and 26 must be controlled in predetermined manners. A means for accomplishing this is suggested in FIG. 1 in which a source of control signals 33 provides an electrical signal of variable amplitude, and this signal is then coupled to the respective function generators 34 and 34' which in turn are coupled to the respective electro-optic materials 24 and 26. The function generators 34 and 34' operate upon a control signal from source 33 so as to provide the appropriate biasing voltages $E_m$ and $E_c$ that will insure the desired frequency tuning of the laser output signal. It will be understood that the operations performed by the function generators 34 and 34' will take into account the particular properties of electro-optic materials and the frequency response characteristics of the laser cavity and of etalon 19.

Figure 3:
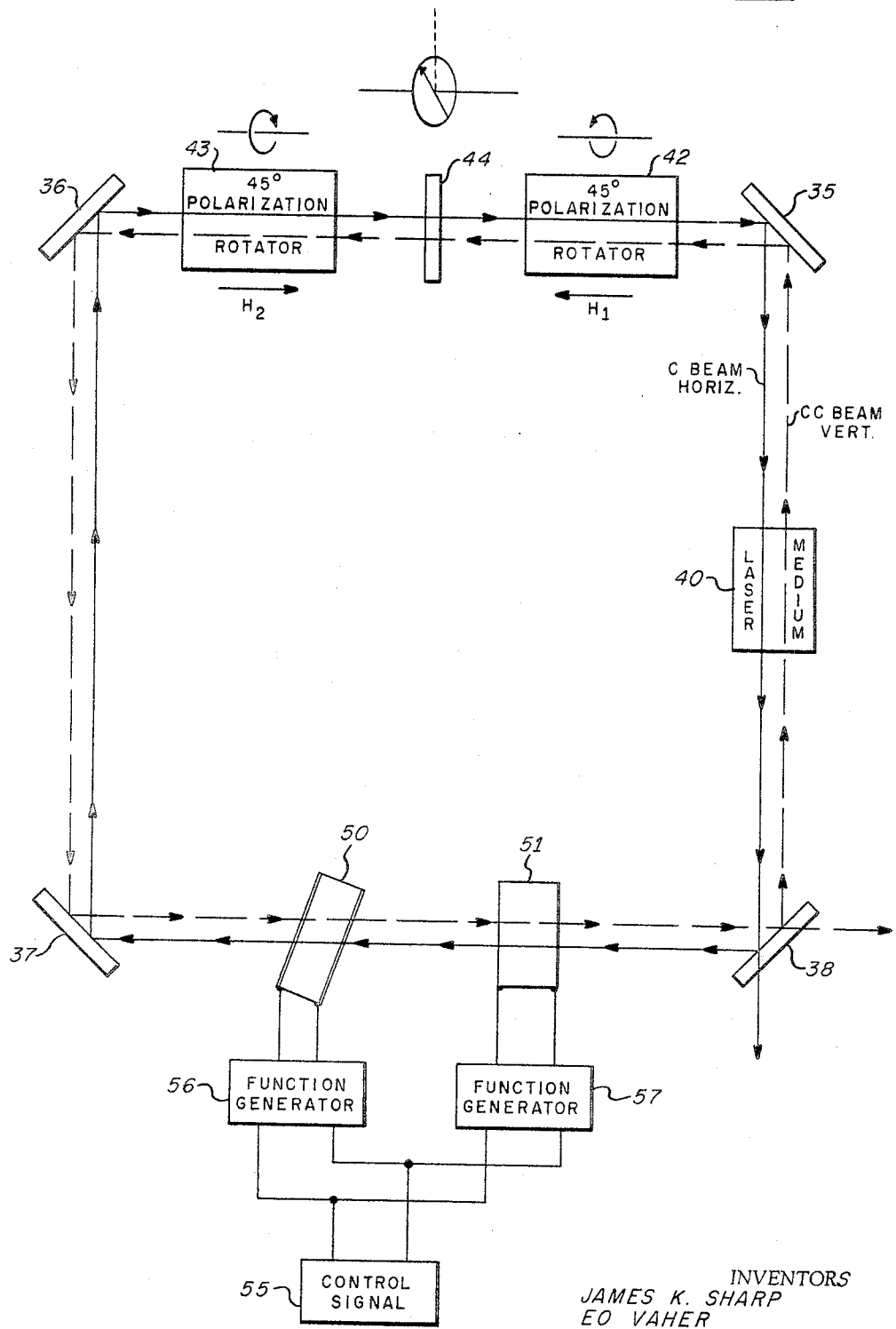
FIG. 3 is a simplified illustration of a ring laser device that is frequency tunable in accordance with the present invention.

The teachings of the present invention also may be utilized to independently control the frequency of one of two different light beams that are simultaneously propagating in one physical light cavity, thereby producing the effect of providing two different cavities, one of whose frequency is independently controllable. This type of operation may be achieved in a laser whose optical cavity is in the form of a closed ring as illustrated in FIG. 3. The closed ring optical cavity is provided by the corner mirrors 35, 36, 37 and 38. Mirror 38 is of a lower reflectivity in order to allow the circulating light beams to exit from the ring. A lasing medium 40 is located in one leg of the ring and, in this embodiment, is characterized by emitting coherent light that is substantially unpolarized, or at least has appreciable emission of linearly polarized light in two orthogonal polarizations. It is known that many types of lasers produce coherent light that is not polarized in any one linear polarization. For example, a neodymium doped glass rod has been used successfully to produce the desired type of light emission. It is desired to establish within the ring two oppositely rotating linearly polarized beams wherein the oppositely rotating beams are orthogonally polarized with respect to each other. The orthogonal polarizations of the counterrotating light beams are established in the top leg of the ring by the use of two Faraday rotators 42 and 43 and a plane polarizer 44 which passes only linearly polarized light that is polarized at an angle of 45° from the vertical. The Faraday rotators 42 and 43 operate to rotate linearly polarized light waves in opposite directions. For example, rotator 42 will rotate linearly polarized light 45° in a counterclockwise direction when looking from right to left along the propagating path, and rotator 43 will operate to rotate the light 45° in a clockwise direction when looking along the same direction of propagation. To obtain the opposite rotations from the Faraday rotators 42 and 43, oppositely directed magnetizing fields $H_1$ and $H_2$ may be applied to the respective rotators.

In considering the operation of the top leg of the ring, consider first that polarizer 44 will pass only linearly polarized light waves with a polarization of 45° in a direction counterclockwise from the vertical, as illustrated in the diagram immediately above the element 44. Considering next propagation in the clockwise direction around the ring ($c$ beam), light polarized at 45° passes through Faraday rotator 42 and is rotated an additional 45° and thus is horizontally polarized. This light beam is reflected from mirror 35, passes through laser medium 40 and is successively reflected from the corner mirrors 38, 37 and 36 and then reappears at the top leg of the ring. Upon passing through rotator 43 the light waves are rotated in a clockwise direction to an angle of 45° from the vertical, this being the angle of polarization that is passed by the polarizer 44. Thus, the $c$ beam will continue propagating about the ring in this manner so that it will appear as horizontally polarized in the two side legs and in tht bottom leg of the ring.

Consider now the light propagating in the counterclockwise direction about the ring ($cc$ beam). This light will pass through polarizer 44 at a counterclockwise angle of 45° from the vertical and will be rotated 45° in the clockwise direction upon passing through rotator 43, that is, it now is vertically polarized. This vertically polarized $cc$ beam will be successively reflected from corner cirrors 36, 37, 38 and 35 and will reappear at the top leg of the ring still as vertically polarized light. Upon passing through rotator 42 the vertically polarized waves will be rotated 45° in the counterclockwise direction so that it now is properly polarized to pass through the polarizer 44. The $cc$ beam will continue to rotate about the ring in a manner just described so that in the two side legs and in the bottom leg of the ring it appears as a vertically polarized light beam. From this discussion it may be seen that the counterrotating $c$ beam and $cc$ beam are orthogonally polarized in the three legs of the ring laser. In the absence of any components in the left leg and in the bottom leg of the ring laser, the two counterrotating orthogonally polarized light beams will have substantially the same spectral characteristic as determined by the optical length of the ring cavity.

One of the counterrotating light beams may have its frequency varied in a manner described in connection with FIG. 1 wholly independently of the frequency of the other light beam by employing birefringent electro-optic material between the mirrors of etalon 50 and in the separate phase shifting element 51. The birefringent electro-optic material, such as the abovementioned ADP or KDP, is crystallographically cut and oriented so that one of the rotating beams is polarized parallel to the $z$ direction in the crystal while the orthogonally polarized oppositely rotating beam is polarized parallel to the $x$ or $y$ crystal direction. For example, the birefringent electro-optic material within etalon 50 and phase shifting element 51 will be cut and oriented so that the $z$ axis of the crystal is parallel to the horizontally polarized $c$ beam. With this arrangement, the $c$ beam will "see" the same indices of refraction in each of the elements 50 and 51 irrespective of the electrical potential applied across those elements. The vertically polarized $cc$ beam, however, is polarized parallel to an electro-optic active direction of the crystal and will "see" variations in the indices of refraction of the birefringent electro-optic material within etalon 50 and phase shifting element 51. The frequency of the $cc$ beam may now be changed independently of the frequency of the $c$ beam by applying a signal from the control signal source 55, through the respective function generators 56 and 57 to the respective birefringent electro-optic materials and etalons 50 and 51.

Although only one active lasing material 40 is shown in the closed loop of FIG. 3, additional active lasing materials may be included if desired.

It now is believed to be apparent that the continuous frequency tuning of one of the beams in the arrangement of FIG. 3 is possible by the addition of a phase shifting element such as 51 in connection with the electro-optically controlled canted etalon 50. Without the phase shifting element, the frequency of a beam could be varied only in discrete jumps between axial modes, and without the canted etalon the frequency of the light could not be restricted to one or a few adjacent axial modes but the emission would be spread throughout the fluorescent light width of the laser.

What is claimed is:
1. A frequency tunable laser comprising,
an optical cavity capable of supporting a plurality of laser modes,
an active lasing material disposed within said cavity for producing laser radiation,
interferometer means within said cavity in the path of said laser radiation,
means for changing the frequency response characteristic of said cavity to shift the frequency of said laser modes, and
means for changing the frequency response characteristic of said interferometer such that it tracks the laser mode frequency shift produced by the cavity frequency response changing means.
2. A frequency tunable laser comprising,
an optical cavity capable of supporting a plurality of laser modes,
a lasing material in said cavity for producing stimulated emissions of coherent light,
interferometer means within said cavity in the path of said light, means for changing the resonant frequency of said optical cavity to shift the frequency of said laser modes, and means for changing the resonant frequency of said interferometer such that it tracks the laser mode frequency shift produced by the cavity resonant frequency changing means.

3. The combination claimed in claim 2 wherein the means for changing the resonant frequency of said interferometer includes means for changing the index of refraction of the light path within said interferometer.

4. The combination claimed in claim 3 wherein the means for changing the index of refraction includes an electro-optic material.

5. The combination claimed in claim 2 wherein the means for changing the resonant frequency of the optical cavity includes, means for changing the index of refraction of the light path within the cavity.

6. The combination claimed in claim 5 wherein the means for changing the index of refraction of the light path within the cavity includes an electro-optic material.

7. The combination claimed in claim 2 wherein the means for changing the resonant frequency of the optical cavity and the means for changing the resonant frequency of the interferometer are birefringent materials.

8. In a laser device for producing two independent light beams at least one of which is controllable in frequency, the combination comprising, means for forming a light path having the form of a closed loop, lasing material in said loop for producing stimulated emissions of light that propagate in opposite directions around said loop, means in said loop for establishing respective distinguishing propagating characteristics for the light propagating in the opposite directions around said loop, frequency selective means in said loop responsive to light propagating in one of said directions around the loop for restricting the frequency of the light propagating in that one direction to a selected frequency band, means for changing the optical length of the closed loop exclusively for light propagating in said one direction to change the frequency thereof, and means for changing said selected frequency band exclusively for light propagating in said one direction to track the change in its frequency produced by the closed loop optical length changing means.

9. In a laser device for producing two independent light beams, at least one of which is controllable in frequency, the combination comprising, means for forming a light path having the form of a closed loop, lasing material in said loop for producing stimulated emissions of coherent light that propagate in opposite directions around said loop, means in said loop for establishing respective different polarizations for the light propagating in the opposite directions around said loop, interferometer means in said loop operative on light of one of said polarizations for restricting the frequency of light of said one polarization to the resonant frequency of said interferometer, means for changing the optical length of the closed loop exclusively for light having said one polarization so as to change its frequency, and means for changing the resonant frequency of said interferometer means exclusively for light having said one polarization to track the change in its frequency produced by the closed loop optical length changing means.

References Cited

UNITED STATES PATENTS

| | | | |
|---|---|---|---|
| 3,243,722 | 3/1966 | Billings | 331—94.5 |
| 3,277,392 | 10/1966 | Nicolai | 331—94.5 |
| 3,327,243 | 6/1967 | Stickley | 331—94.5 |
| 3,358,243 | 12/1967 | Collins et al. | 331—94.5 |

OTHER REFERENCES

Guidice et al.: "Ring Laser Techniques for Angular Rotation Sensing," Technical Documentary Report No. ASD–TDR–63–694, September 1963. Released for sale to general public in December 1963. 45 pages. Title page, Notices, pp. 11–17, 20 and 30 relied upon.

JEWELL H. PEDERSEN, *Primary Examiner.*

R. L. WIBERT, *Assistant Examiner.*